United States Patent
Tsurumi et al.

(10) Patent No.: US 8,616,311 B2
(45) Date of Patent: Dec. 31, 2013

(54) ELECTRICAL STORAGE DEVICE

(75) Inventors: Yoshihisa Tsurumi, Hitachinaka (JP); Shinichi Fujino, Mito (JP); Sadashi Seto, Hitachinaka (JP)

(73) Assignees: Hitachi, Ltd., Tokyo (JP); Hitachi Vehicle Energy, Ltd., Hitachinaka-shi (JP)

( * ) Notice: Subject to any disclaimer, the term of this patent is extended or adjusted under 35 U.S.C. 154(b) by 285 days.

(21) Appl. No.: 12/892,594

(22) Filed: Sep. 28, 2010

(65) Prior Publication Data

US 2011/0155485 A1 Jun. 30, 2011

(30) Foreign Application Priority Data

Dec. 28, 2009 (JP) ................................ 2009-297794

(51) Int. Cl.
*B60K 1/04* (2006.01)
(52) U.S. Cl.
USPC ................. 180/65.22; 180/65.1; 180/65.275; 429/151; 429/153; 361/753; 361/799
(58) Field of Classification Search
USPC ............ 180/65.1, 65.29, 65.275, 68.5; 429/7, 429/153, 159, 163, 177; 307/9.1, 10.1, 307/10.6, 10.7; 361/753, 212, 216, 217, 361/752, 799; 903/903, 951, 952
See application file for complete search history.

(56) References Cited

U.S. PATENT DOCUMENTS

| | | | | |
|---|---|---|---|---|
| 2,094,329 | A * | 9/1937 | Mascuch | 429/176 |
| 5,608,611 | A * | 3/1997 | Szudarek et al. | 361/753 |
| 5,760,587 | A * | 6/1998 | Harvey | 324/434 |
| 2001/0046624 | A1* | 11/2001 | Goto et al. | 429/99 |
| 2002/0070733 | A1 | 6/2002 | Takada et al. | |
| 2005/0095499 | A1* | 5/2005 | Kanai et al. | 429/83 |
| 2005/0231175 | A1 | 10/2005 | Furukawa et al. | |
| 2006/0012336 | A1 | 1/2006 | Fujita | |
| 2006/0077643 | A1* | 4/2006 | Mayuzumi et al. | 361/753 |
| 2006/0279086 | A1 | 12/2006 | Kishibata et al. | |
| 2007/0141455 | A1* | 6/2007 | Marukawa et al. | 429/120 |
| 2008/0053716 | A1* | 3/2008 | Scheucher | 180/2.1 |
| 2008/0057393 | A1* | 3/2008 | Onuki et al. | 429/159 |
| 2008/0264291 | A1* | 10/2008 | Pike et al. | 105/50 |
| 2008/0266820 | A1* | 10/2008 | Jairazbhoy et al. | 361/753 |
| 2009/0086462 | A1* | 4/2009 | Funato et al. | 361/818 |
| 2009/0191453 | A1 | 7/2009 | Fujii et al. | |
| 2009/0226806 | A1* | 9/2009 | Kiya | 429/186 |
| 2009/0258282 | A1* | 10/2009 | Harada et al. | 429/61 |
| 2010/0112424 | A1 | 5/2010 | Hayashi | |

FOREIGN PATENT DOCUMENTS

| | | | |
|---|---|---|---|
| JP | 2002-139523 | A | 5/2002 |
| JP | 2004-319304 | A | 11/2004 |
| JP | 2005-315853 | A | 11/2005 |
| JP | 2006-053120 | A | 2/2006 |

(Continued)

OTHER PUBLICATIONS

European Search Report dated Apr. 19, 2011 (Six (6) pages).

*Primary Examiner* — Katy M Ebner
*Assistant Examiner* — Steve Clemmons
(74) *Attorney, Agent, or Firm* — Crowell & Moring LLP

(57) ABSTRACT

An electrical storage device includes: a conductive battery house casing electrically connected to a chassis; a plurality of battery cells held in the battery house casing; and a control unit that comprises a circuit that manages the plurality of battery cells and is mounted on the battery house casing so that a negative terminal of the circuit and the battery house casing are electrically conducting.

10 Claims, 6 Drawing Sheets

(56) References Cited

FOREIGN PATENT DOCUMENTS

| | | | |
|---|---|---|---|
| JP | 2006-156227 A | 6/2006 |
| JP | 2006-344447 A | 12/2006 |
| JP | 2008-192551 A | 8/2008 |
| JP | 2009-181737 A | 8/2009 |
| JP | 2009-252460 A | 10/2009 |

\* cited by examiner

ELECTRICAL STORAGE DEVICE

INCORPORATION BY REFERENCE

The disclosure of the following priority application is herein incorporated by reference: Japanese Patent Application No. 2009-297794 filed Dec. 28, 2009

BACKGROUND OF THE INVENTION

1. Field of the Invention

The present invention relates to an electrical storage device that includes a battery module with a plurality of battery cells housed in a battery house casing and a management circuit thereof.

2. Description of Related Art

Electric vehicles that use a rotating electric machine as a driving source and hybrid vehicles that use both an internal combustion engine and a rotating electric machine have recently been put to practical use. Those types of vehicles are mounted with a battery that supplies electrical energy to the rotating electric machine, and such battery to be mounted includes rechargeable secondary batteries such as a nickel-cadmium battery, a nickel-metal hydride battery, and a lithium ion battery.

A secondary battery is usually constituted as a battery module with a plurality of battery cells placed on top of one another, the bottom surface of a battery house casing is attached to the vehicle body through a module base, and a battery controller is mounted in the neighborhood thereof such as the top surface of the battery house casing or a side surface to manage the state of electrical storage, as disclosed in Japanese Laid Open Patent Publication No. 2004-319304.

A battery controller includes a built-in electric circuit, which needs to be grounded for its normal operation, and therefore the battery controller and the module base are often connected through a thick ground wire.

SUMMARY OF THE INVENTION

When a battery controller and a module base are connected through a thick ground wire, the cost of the ground wire is high and its assembly work is complicated.

An electrical storage device according to a first aspect of the present invention comprises: a conductive battery house casing electrically connected to a chassis; a plurality of battery cells held in the battery house casing; and a control unit that comprises a circuit that manages the plurality of battery cells and is mounted on the battery house casing so that a negative terminal of the circuit and the battery house casing are electrically conducting.

According to a second aspect of the present invention, the electrical storage device according to the first aspect further comprises a mounting member that electrically connects and fixes the battery house casing to the chassis.

According to a third aspect of the present invention, in the electrical storage device according to the first aspect, the battery house casing may comprise: a conductive lower base; a conductive upper base that is connected to the lower base from above to form a casing body circularly formed with both side surfaces being open; and side plates that hold the battery cells while closing the both side surfaces of the casing body.

According to a fourth aspect of the present invention, in the electrical storage device according to the first aspect, the battery house casing may comprise a circular member with both side surfaces being open; and side plates that hold the battery cells while closing the both side surfaces of the circular member.

According to a fifth aspect of the present invention, the electrical storage device according to the fourth aspect may further comprise a mounting member that electrically connects and fixes the battery house casing to the chassis.

According to a sixth aspect of the present invention, the electrical storage device according to the fifth aspect may further comprise a plurality of the battery house casings in which a battery assembly constituted with the plurality of battery cells is housed, wherein: the control unit may be mounted astride a top surface of the plurality of battery house casings.

According to a seventh aspect of the present invention, in the electrical storage device according to the first to sixth aspects, the battery house casing may be formed from die-cast aluminium.

An electric powered vehicle according to an eighth aspect of the present invention comprises: a travel drive device that generates travel drive on electric power; an electrical storage device according to the fourth to seventh aspects that generates the electric power; and a vehicle body on which the travel drive device is provided, wherein: the battery house casing is mounted on the vehicle body through a mounting member so that the vehicle body is set to ground potential.

An electrical storage device according to a ninth aspect of the present invention comprises: a first and second conductive battery house casings being juxtaposed; a first and second battery assemblies, each of which is constituted with a plurality of battery cells, that are held in the first and second battery house casings, respectively; and a control unit that comprises a circuit which manages the first and second battery assemblies and that is mounted on the first and second battery house casings so that a negative terminal of the circuit and the first and second battery house casings are electrically conducting and the first and second battery house casings are integrated.

DESCRIPTION OF PREFERRED EMBODIMENTS

The electrical storage device according to an embodiment of the present invention will now be explained in detail with reference to the drawings.

An example will be explained in terms of the electrical storage device according to an embodiment being applied to an electrical storage device that constitutes a vehicle-mounted power source system for an electric powered vehicle, in particular an electric vehicle. An electric vehicle includes a hybrid electric vehicle that has both an internal combustion engine and an electric machine as a driving source of the vehicle and a pure electric vehicle that has an electric machine as an only driving source of the vehicle.

Figure 1:
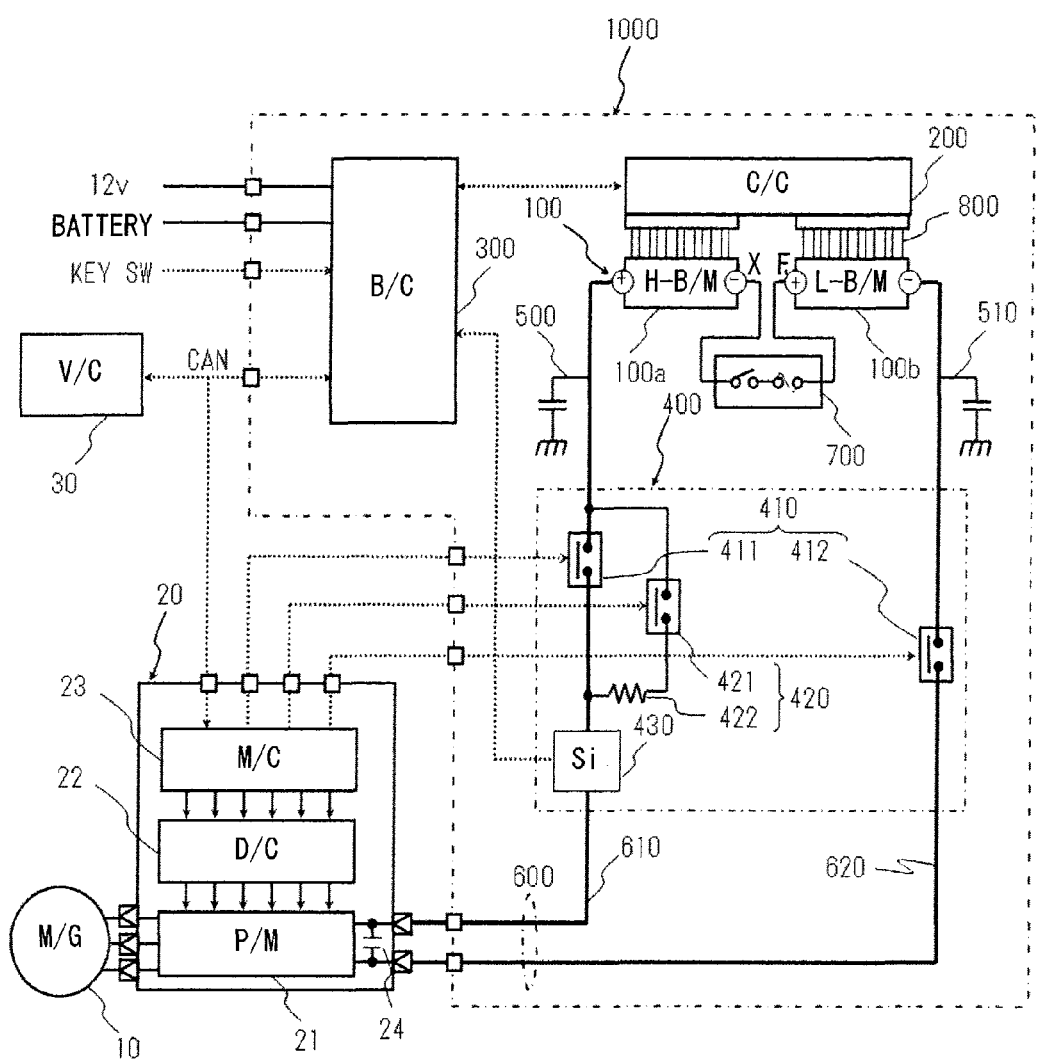
FIG. 1 is a block diagram showing the structure of a vehicle-mounted electric machine system in which an electrical storage device according to an embodiment of the present invention is used.

The structure of the vehicle-mounted electric machine system (electrical machine driving system) that includes the electrical storage device according to an embodiment will now be explained with reference to FIG. 1.

The vehicle-mounted electric machine system includes a motor generator 10, an inverter device 20, a vehicle controller 30 that controls the whole vehicle, and an electrical storage device 1000 that constitutes a vehicle-mounted power source. The electrical storage device 1000 includes a plurality of storage batteries and is constituted as, for instance, a lithium ion battery device that includes a plurality of lithium ion battery cells.

An electric powered vehicle, including an electric vehicle and a hybrid vehicle, on which such vehicle-mounted electric machine system is mounted includes a travel drive device that generates travel drive on electric power, the electrical storage device according to the present invention that supplies electric power to the travel drive device, and a vehicle body that is provided with the travel drive device. The electrical storage device includes a battery block constituted by housing a battery assembly constituted with a plurality of battery cells into a conductive casing and a control unit that includes a battery controller and a cell controller that manage the battery cells. In the electrical storage device according to the present invention, in particular, in order to provide a ground path of a negative terminal of the circuit board of the battery controller and the cell controller, the controller is grounded to the vehicle body grounding only by integrating the control unit to the battery block without separately routing a conventional ground wire.

The motor generator 10 is a three-phase alternate-current machine. Any of two types of three-phase AC machine, a synchronous machine and an induction machine, may be adopted. In operating mode requiring rotational power such as during power running of the vehicle or starting the internal combustion engine, the motor generator 10 drives the motor and supplies the generated rotational power to driven bodies such as wheels and the engine. In this case, the vehicle-mounted electric machine system converts DC (direct current) power into three-phase AC electric power and supplies it from the lithium ion battery device 1000 to the motor generator 10 via the inverter device 20, which is an electric power conversion device.

In operating mode requiring power generation, for instance, during regeneration such as decelerating or braking the vehicle or when the lithium ion battery device 1000 needs to be recharged, the motor generator 10 receives drive power from the wheels or the engine and works as a generator to generate three-phase AC electric power. In this case, the vehicle-mounted electric machine system converts the three-phase AC electric power from the motor generator 10 into DC power via the inverter device 20 and supplies it to the lithium ion battery device 1000. As a result, electric power is accumulated in the lithium ion battery device 1000.

The motor generator 10 is an electric machine that is operated by a magnetic influence of an armature, for example, a stator and a field, for example, a rotor, that is disposed opposite the armature and rotatably supported. The motor generator 10 assumes a structure that allows the axis of rotation of the field to be mechanically connected to the axis of rotation of the driven bodies such as the wheels and the engine so that rotational power can be directed to and from the driven bodies.

The armature is a part that is to be supplied with three-phase AC electric power to generate a rotating magnetic field when the motor generator 10 is engaged in operation as a motor or as a generator. The armature includes an armature core, that is, a stator core, which is a magnetic material, and a three-phase armature winding, that is, a stator winding, attached to the armature core.

The field is a part that generates field magnetic flux when the motor generator 10 is engaged in operation as a motor or a generator. The field includes a field core, that is, a rotor core, which is a magnetic material, and a permanent magnet, a field winding, that is, a rotor winding, or conductor bar, that are attached to the field core, or the field core and both a permanent magnet and a field winding (or a conductor bar). The field winding generates magnetic flux by being excited with field current supplied from an external power source.

The inverter device 20 is an electronic circuit device that controls the power conversion described above, i.e., the conversion from DC power to three-phase AC electric power and from three-phase AC electric power to DC power, by operation (ON/OFF) of a switching semiconductor device. The inverter device 20 includes a power module 21, a driver circuit 22, a motor controller 23, and a smoothing capacitor 24.

The power module 21 is a power conversion circuit that includes six switching semiconductor devices to perform the power conversion described above by switching operation (ON/OFF) of the six switching semiconductor devices. A metal-oxide semiconductor field-effect transistor (MOSFET) or an insulated gate bipolar transistor (IGBT) is used for the switching semiconductor devices. When the power module 21 is constituted with a MOSFET, parasitic diodes are electrically connected in inverse parallel between a drain electrode and a source electrode. When the power module 21 is constituted with an IGBT, on the other hand, it is separately necessary for diodes to be electrically connected in inverse parallel between a collector and an emitter. The power conversion circuit is constituted with a three-phase bridge circuit, in which series circuits (an arm for one phase), each of which includes two (an upper arm and a lower arm) switching semiconductor devices electrically connected in series, are electrically connected in parallel for three phases.

The side of each upper arm opposite the lower arm connection side is electrically connected to a DC positive pole-side module terminal, and the side of each lower arm opposite the upper arm connection side is electrically connected to a DC negative pole-side module terminal. The middle point of each of the upper and the lower arms, i.e., the sides of each of the upper and the lower arms connecting to each other, are electrically connected to an AC-side module terminal. The DC positive pole-side module terminal and the DC negative pole-side module terminal are electrically connected to a DC positive pole-side external terminal and a DC negative pole-side external terminal, respectively. The DC positive pole-side external terminal and the DC negative pole-side external terminal are power source-side terminals to direct DC power to and from the lithium ion battery device 1000 and electrically connected with a power cable 600 that extends from the lithium ion battery device 1000. The AC-side module terminal is electrically connected to an AC-side external terminal. The AC-side external terminal is a load side terminal to direct three-phase AC electric power to and from the motor generator 10 and electrically connected with a load cable that extends from the motor generator 10.

The smoothing capacitor 24 is electrically connected in parallel between the DC positive pole-side and the DC negative pole-side of the power conversion circuit in order to inhibit a voltage fluctuation that arises from a high speed switching operation of the switching semiconductor devices constituting the power conversion circuit.

The motor controller 23 is an electronic circuit device to control the switching operation of the six switching semiconductor devices constituting the power conversion circuit. Based upon a torque command having been output from the vehicle controller 30 that controls a higher-order control unit, for instance the whole vehicle, the motor controller 23 generates a switching operation command signal, for example, PWM (pulse width modulation) signal, to the six switching semiconductor devices. The generated command signal is output to the driver circuit 22.

Based upon the switching operation command signal having been output from the motor controller 23, the driver circuit 22 generates a drive signal to the six switching semiconductor devices constituting the power conversion circuit. The generated drive signal is output to a gate electrode of the six switching semiconductor devices constituting the power conversion circuit. As a result, switching (ON/OFF) of the six switching semiconductor devices constituting the power conversion circuit is controlled based upon the drive signal having been output from the driver circuit 22.

Figure 2:
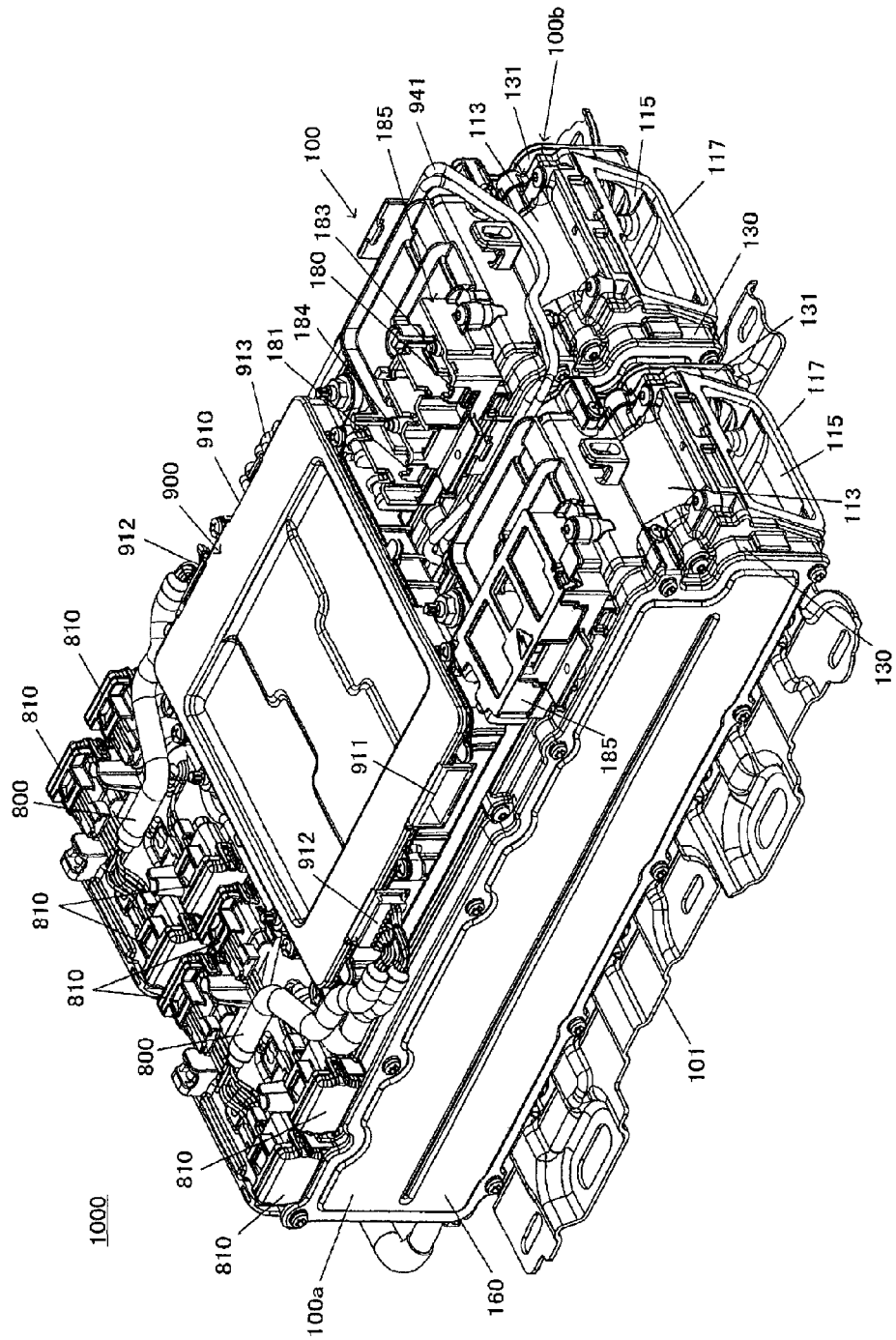
FIG. 2 is a perspective view showing the external structure of a whole lithium ion battery device according to an embodiment of the present invention.

The lithium ion battery device 1000 includes a battery module 100 to accumulate and release electrical energy, i.e., to charge and discharge DC power, and a control unit 900 to manage and control the state of the battery module 100 (refer to FIG. 2).

The battery module 100 is constituted with two battery blocks or battery packs, i.e., a higher potential battery block 100a and a lower potential battery block 100b that are electrically connected in series. A battery assembly is housed in each of the battery blocks. Each of the battery assemblies is constituted with a combination of a plurality of lithium ion battery cells that are electrically connected in series. The structure of each of the battery blocks will be described later.

An SD (service disconnect) switch 700 is provided between the negative pole-side, or lower potential side, of the higher potential battery block 100a and the positive pole-side, or higher potential side, of the lower potential battery block 100b. The SD switch 700, a safety device provided to ensure the safety at maintenance and inspection of the lithium ion battery device 1000, is constituted with an electrical circuit in which a switch and a fuse are electrically connected in series, and to be operated by a serviceman at the time of maintenance and inspection.

The control unit 900 is constituted with a higher-order (parent) battery controller 300 and a lower-order (child) cell controller 200. Although not shown in the figures, the control unit 900 is constituted by mounting the control board of the battery controller 300 and the control board of the cell controller 200 onto a board mount surface of a base 910 formed of a conductive material. When those control boards are mounted, the negative terminal of each of the control boards of the battery controller 300 and the cell controller 200 is electrically connected to the base 910. It is to be noted that in the interests of brevity, grounding of the battery controller 300 and the cell controller 200 will be hereinafter explained as a synonym of connection of the negative terminal of each of the control boards to the vehicle body grounding potential.

As described below, the higher potential battery block 100a and the lower potential battery block 100b are juxtaposed, and the control unit 900 is disposed astride their top surfaces. In other words, the control unit 900 and the base 910 are mounted to the blocks 100a and 100b so as to integrate both of the blocks 100a and 100b.

It is to be noted that as described later, the battery blocks 100a and 100b are constituted by housing a plurality of battery cells in a conductive casing 110. The casing 110 is then electrically and mechanically connected to the vehicle body through a conductive module base 101. The potential at the negative terminals of the battery controller 300 and the cell controller 200 hence becomes equal to the ground potential at the vehicle body through the casing 110. As a result, a ground wire through which the battery controller 300 and the cell controller 200 are grounded to the vehicle body is not required.

The battery controller 300 manages and controls the state of the lithium ion battery device 1000 and notifies the vehicle controller 30 and the motor controller 23, which are higher-order control units, of the state of the lithium ion battery device 1000 and a charge/discharge control command to control allowable charge/discharge electric power and the like. The management and control of the state of the lithium ion battery device 1000 include measurement of the voltage and current at the lithium ion battery device 1000, arithmetic operations of the state of charge (SOC), the state of health (SOH), and the like at the lithium ion battery device 1000, measurement of temperature at each of the battery blocks, output of a command to the cell controller 200 (for example, a command to measure the voltage at each of the lithium ion battery cells, a command to adjust the stored charge at each of the lithium ion battery cells, and the like), and the like.

The cell controller 200 is a so-called hand and foot of the battery controller 300, which, according to a command from the battery controller 300, manages and controls the state of the plurality of lithium ion battery cells and is constituted with a plurality of integrated circuits (IC). The management and control of the state of the plurality of lithium ion battery cells include measurement of the voltage at each of the lithium ion battery cells, adjustment of the stored charge at each of the lithium ion battery cells, and the like. Each of the integrated circuits is designated to a plurality of corresponding lithium ion battery cells, and manages and controls the state of the plurality of corresponding lithium ion battery cells.

The power source of the battery controller 300 uses a battery for auxiliaries, in case of an automobile, a lead acid battery with a nominal output voltage of 12V, that is mounted as a power source for vehicle-mounted auxiliaries, for instance, lights and audio equipment. For this reason, voltage (12V for instance) is applied from the battery for auxiliaries to the battery controller 300. The battery controller 300 steps down (steps down to 5V for example) the applied voltage via a power source circuit constituted with a DC-DC power converter and applies the stepped down voltage to electronic components that constitute the battery controller 300 as a drive voltage. As a result, the electronic components that constitute the battery controller 300 are actuated.

The plurality of corresponding lithium ion battery cells are used as a power source of the integrated circuits that constitute the cell controller 200. For this reason, the cell controller 200 and the battery module 100 are electrically connected with each other through a connecting wire 800. Voltage of the highest potential at the plurality of corresponding lithium ion battery cells is applied to each of the integrated circuits through the connecting wire 800. Each of the integrated circuits steps down the applied voltage via the power source circuit (steps down to 5V for example) and uses it as an operational power source.

A signal that has been output from an ignition key switch is input to the battery controller 300. The signal that has been output from the ignition key switch is used as a signal of start-up and shutdown of the lithium ion battery device 1000.

When the ignition key switch enters the ON state, in the battery controller 300, the power source circuit is actuated based upon an output signal from the ignition key switch, and a drive voltage is applied from the power source circuit to a plurality of electronic circuit components so that the plurality of electronic circuit components are actuated. The battery controller 300 starts up as a result. When the battery controller 300 starts up, a start-up command is output from the battery controller 300 to the cell controller 200. In the cell controller 200, based upon the start-up command from the battery controller 300, the power source circuits of the plurality of integrated circuits are actuated in sequence and the plurality of integrated circuits start up in sequence. The cell controller 200 starts up as a result. When the cell controller 200 starts up, predetermined initial processing is executed so that the lithium ion battery device 1000 starts up.

The predetermined initial processing includes, for instance, measurement of the voltage at each of the lithium ion battery cells, an abnormality diagnosis, measurement of the voltage and current at the lithium ion battery device 1000, measurement of the temperature at each of the battery blocks, arithmetic operations on the state of charge and the state of health of the lithium ion battery device 1000, arithmetic operations of the allowable charge/discharge electric power of the lithium ion battery device 1000, and the like.

When the ignition key switch enters the OFF state, a stop command is output from the battery controller 300 to the cell controller 200. When the cell controller 200 receives the stop command, predetermined termination processing is executed, and then the power source circuits of the plurality of integrated circuits stop in sequence and the plurality of integrated circuits stop in sequence. The cell controller 200 stops as a result. When the cell controller 200 stops and a communication with the cell controller 200 is blocked, in the battery controller 300 the operations of the power source circuits stop and the operations of the plurality of electronic circuit components stop. As a result, the battery controller 300 stops and the lithium ion battery device 1000 stops.

The predetermined termination processing includes, for instance, measurement of the voltage at each of the lithium ion battery cells, adjustment of the stored charge at each of the lithium ion battery cells, and the like.

In-vehicle local area network communication is used for transmission of information between the battery controller 300 and higher-order control units such as the vehicle controller 30 and the motor controller 23. Local interconnect network communication, which conforms to the in-vehicle local area network communication, is used for transmission of information between the battery controller 300 and the cell controller 200.

A positive terminal of the higher potential battery block 100a and the DC positive-side external terminal of the inverter device 20 are electrically connected with each other through a positive-side power cable 610. A negative terminal of the lower potential battery block 100b and the DC negative-side external terminal of the inverter device 20 are electrically connected with each other through a negative-side power cable 620.

A junction box 400 is provided along the power cable 600. A relay mechanism constituted with a main relay 410 and a precharge circuit 420 is housed in the junction box 400. The relay mechanism is an open/close section to allow electrical conduction and block between the battery module 100 and the inverter device 20, more specifically, the relay mechanism allows conduction between the battery module 100 and the inverter device 20 at the start-up of the vehicle-mounted electrical machine system while it allows block between the battery module 100 and the inverter device 20 at the time of stop or in the event of an abnormality of the vehicle-mounted electrical machine system. The relay mechanism thus controls between the lithium ion battery device 1000 and the inverter device 20 so as to ensure a high level of safety of the vehicle-mounted electrical machine system.

Drive of the relay mechanism is controlled by the motor controller 23. Upon reception of a notification of start-up completion of the lithium ion battery device 1000 from the battery controller 300, the motor controller 23 outputs a conduction command signal to the relay mechanism at the start-up of the vehicle-mounted electrical machine system so as to drive the relay mechanism. Upon reception of an OFF output signal from the ignition key switch at the time of stop of the vehicle-mounted electrical machine system, or upon reception of an abnormality signal from the vehicle controller 30 in the event of an abnormality of the vehicle-mounted electrical machine system, the motor controller 23 outputs a block command signal to the relay mechanism so as to drive the relay mechanism.

The main relay 410 is constituted with a positive-side main relay 411 and a negative-side main relay 412. The positive-side main relay 411 is provided along the positive-side power cable 610 and controls an electrical connection between a positive-side of the lithium ion battery device 1000 and a positive-side of the inverter device 20. The negative-side main relay 412 is provided along the negative-side power cable 620 and controls an electrical connection between a negative-side of the lithium ion battery device 1000 and a negative-side of the inverter device 20.

The precharge circuit 420 is a series circuit in which a precharge relay 421 and a resistor 422 are electrically connected in series, and is electrically connected in parallel to the positive-side main relay 411.

At the start-up of the vehicle-mounted electrical machine system, the negative-side main relay 412 is turned on and then the precharge relay 421 is turned on. As a result, the current supplied from the lithium ion battery device 1000 is regulated by the resistor 422 and then is supplied to the smoothing capacitor 24 and charged. After the smoothing capacitor 24 is charged up to a predetermined voltage, the positive-side main relay 411 is turned on and the precharge relay 421 is released. As a result, the main current is supplied from the lithium ion battery device 1000 to the inverter device 20 via the positive-side main relay 411, and the main current at this time becomes equal to or less than the allowable current at the positive-side main relay 411 and the smoothing capacitor 24. Accordingly, the smoothing capacitor 24 and the positive-side main relay 411 can be protected from a large current at the start-up of the vehicle-mounted electrical machine system without having abnormalities, such as significant heat generated at this time which may damage the smoothing capacitor 24 and the fixed and moving contacts of the positive-side main relay 411 which may become fused, caused as a large initial current flowing in momentarily from the lithium ion battery device 1000 to the inverter device 20 due to the electrical charge at the smoothing capacitor 24 being substantially zero.

An ammeter 430 is housed inside the junction box 400. The ammeter 430 is provided so as to detect current supplied from the lithium ion battery device 1000 to the inverter device 20. An output line of the ammeter 430 is electrically connected to the battery controller 300. Based upon a signal that has been output from the ammeter 430, the battery controller 300 detects the current supplied from the lithium ion battery device 1000 to the inverter device 20. The current detection information is notified from the battery controller 300 to the motor controller 23, the vehicle controller 30, and the like. The ammeter 430 may be provided outside the junction box 400. A current detection section of the lithium ion battery device 1000 may not be just on the battery module 100 side of the positive-side main relay 411 but may also be on the inverter device 20 side of the positive-side main relay 411.

It is to be noted that a voltmeter to detect the voltage at the lithium ion battery device 1000 may be housed inside the junction box 400. An output line of the voltmeter, similar to that of the ammeter 430, is electrically connected to the battery controller 300. Based upon an output signal from the voltmeter, the battery controller 300 detects the overall voltage at the lithium ion battery device 1000. The voltage detection information is notified to the motor controller 23 and the vehicle controller 30. It is preferable that a voltage detection section of the lithium ion battery device 1000 is positioned on both the battery module 100 side and the inverter device 20 side of the relay mechanism.

A positive-side capacitor 500 is electrically connected between the positive-side power cable 610 and a chassis ground (assuming a potential equal to that at the vehicle chassis) of the lithium ion battery device 1000. A negative-side capacitor 510 is electrically connected between the negative-side power cable 620 and a chassis ground of the lithium ion battery device 1000. The positive-side capacitor 500 and the negative-side capacitor 510 are provided in order to prevent erroneous operation of the battery controller 300 and the cell controller 200, which are low-rate electrical circuits, and destruction of the integrated circuit (IC) constituting the cell controller 200 due to a surge voltage, by eliminating noise generated via the inverter device 20. While the inverter device 20 includes a noise removal filter, the positive-side capacitor 500 and the negative-side capacitor 510 are provided so as to even more effectively prevent erroneous operations of the battery controller 300 and the cell controller 200, which are low-rate electrical circuits, and destruction of the integrated circuit (IC) constituting the cell controller 200 due to a surge voltage, and improve the noise withstanding reliability of the lithium ion battery device 1000.

Figure 3:
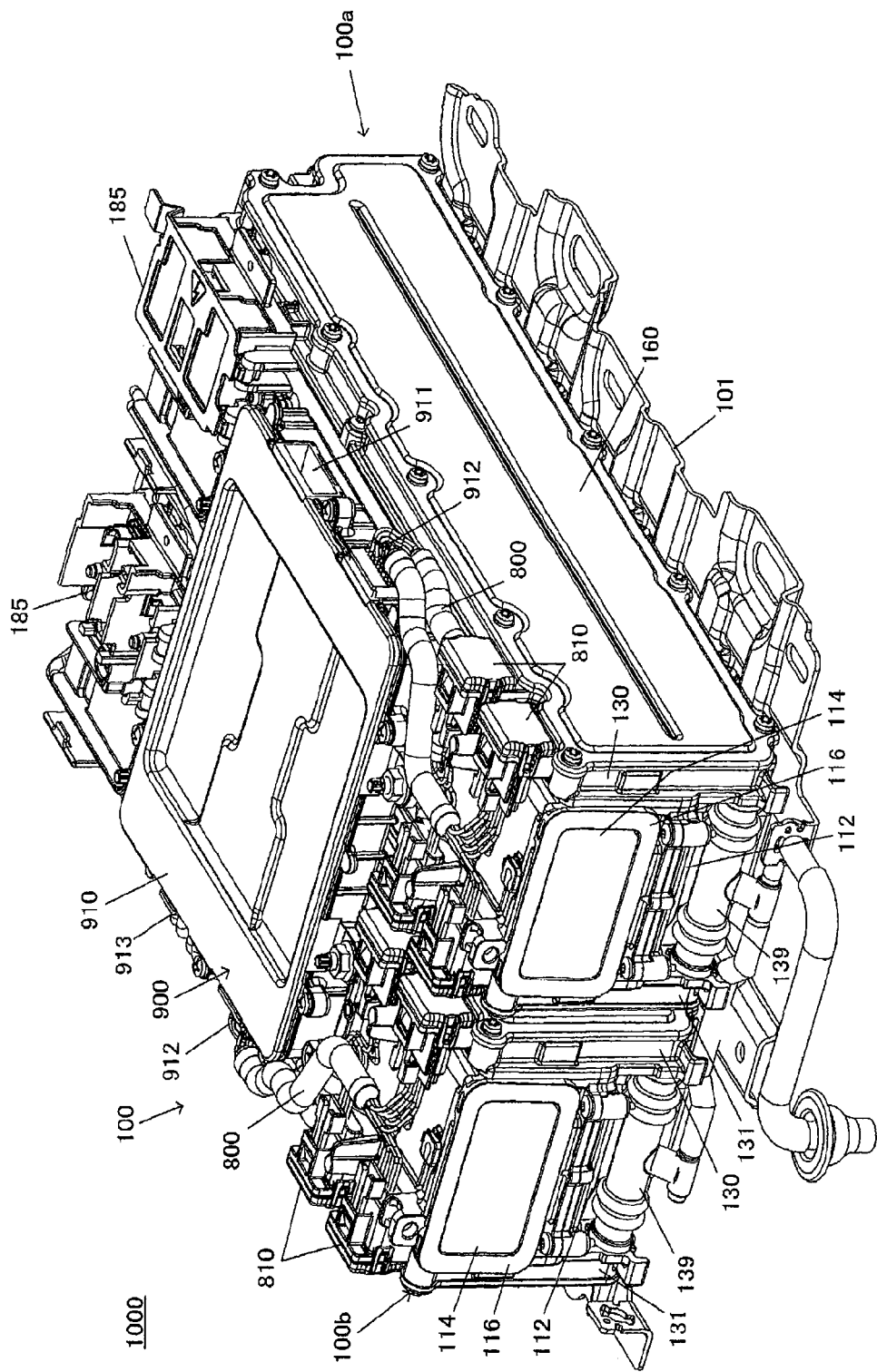
FIG. 3 is a perspective view of the lithium ion battery device shown in FIG. 2, seen from a cooling medium inlet side.
Figure 4:
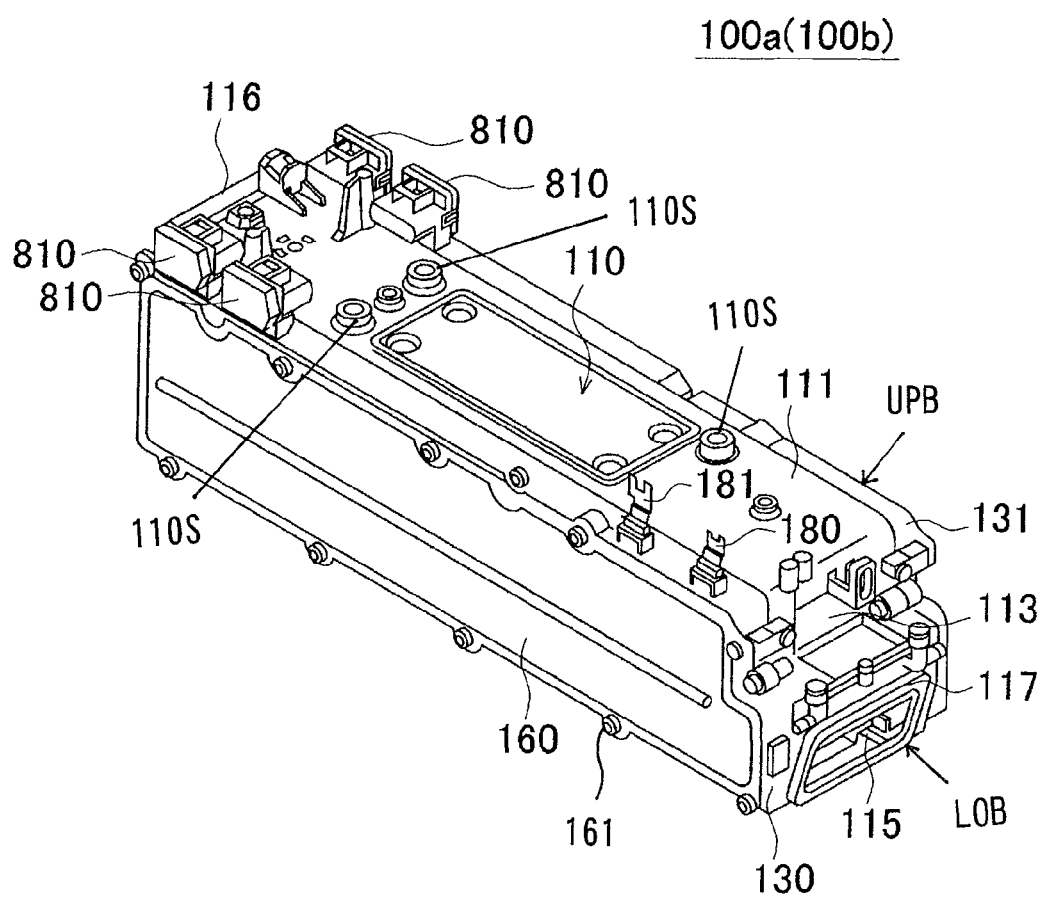
FIG. 4 is a perspective view showing the external appearance structure of a whole battery block of an electrical storage device constituting the lithium ion battery device according to an embodiment.
Figure 5:
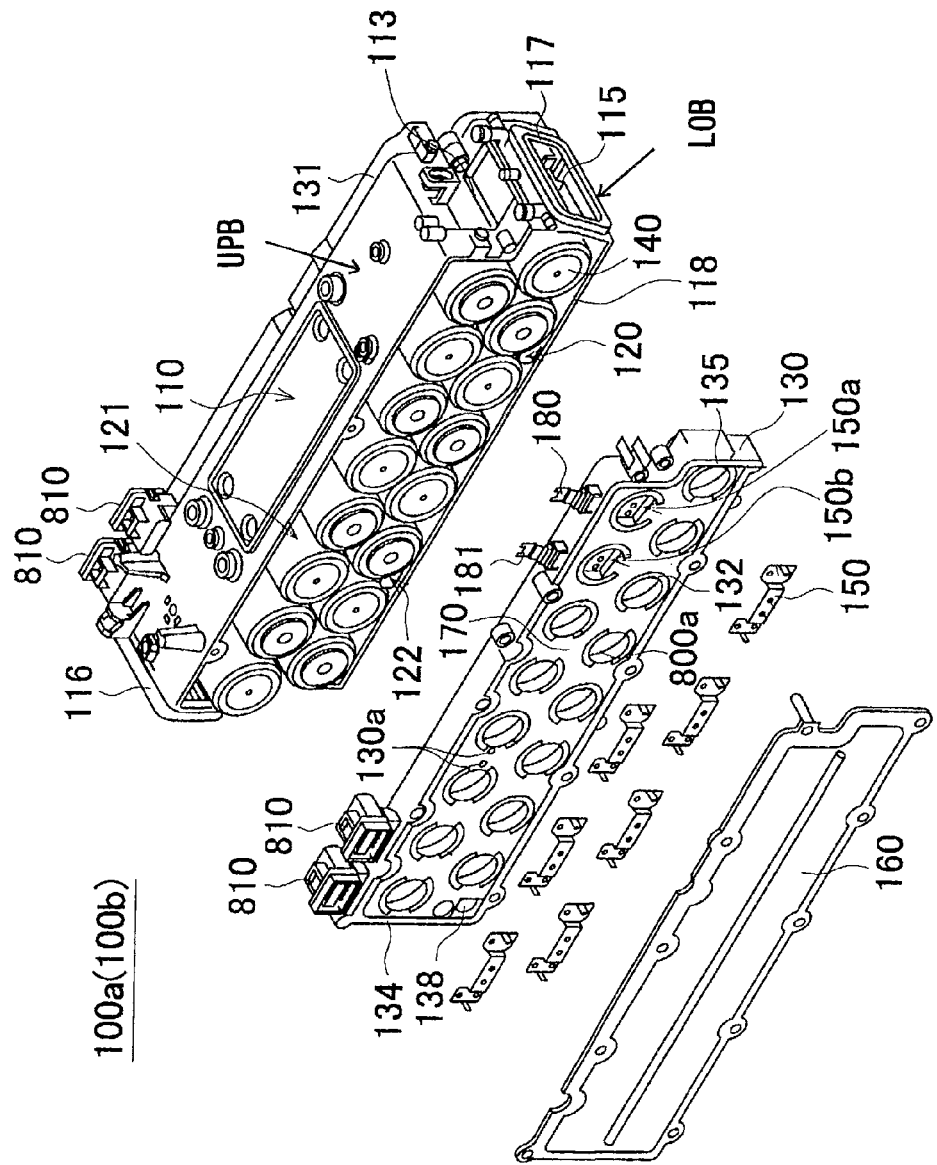
FIG. 5 is an exploded perspective view of the battery block shown in FIG. 4.

Next, the structure of the lithium ion battery device 1000 will be explained in reference to FIG. 2 to FIG. 6. FIGS. 2 and 3 show perspective views presenting the overall structure of the lithium ion battery device 1000. FIG. 4 shows a perspective view of the battery block that constitutes the lithium ion battery device 1000, and FIG. 5 shows an exploded perspective view of the battery block shown in FIG. 4.

The lithium ion battery device 1000 is constituted with two main units of the battery module 100 and the control unit 900. The structure of the battery module 100 will now be explained.

As described earlier, the battery module 100 is constituted with the higher potential battery block 100*a* and the lower potential battery block 100*b*, and the two battery blocks 100*a* and 100*b* are electrically connected in series. It is to be noted that the higher potential battery block 100*a* and the lower potential battery block 100*b* include exactly the same structure. FIGS. 4 and 5 therefore present only the higher potential battery block 100*a* as a representative example of the higher potential battery block 100*a* and the lower potential battery block 100*b*, and an explanation of the detailed structure of the lower potential battery block 100*b* will thus be curtailed.

As shown in FIG. 2, the higher potential battery block 100*a* and the lower potential battery block 100*b* are adjacently disposed in parallel with each other so that longitudinal directions of each of the blocks are in parallel. The higher potential battery block 100*a* and the lower potential battery block 100*b* are juxtaposed on the module base 101 and, as described later, the control unit 900 is disposed astride the top surfaces of the higher potential battery block 100*a* and the lower potential battery block 100*b*, so that both of the blocks 100*a* and 100*b* are integrated by the base 910 of the control unit 900. The module base 101 is constituted with a rigid, thin-wall metal plate (a steel plate for example) that is divided into three in a transverse direction and fixed to the vehicle. In other words, the module base 101 is constituted with three members disposed on the both ends and the middle section in the transverse direction. By adopting this structure, the surface of the module base 101 can be flush with the lower surface of each of the battery blocks 100*a* and 100*b*, so that the dimension of the battery module 100 in the height direction can be further reduced.

As shown in FIG. 5, the higher potential battery block 100*a* is mainly constituted with the battery house casing (hereinafter referred to as the casing) 110 and a battery assembly 120. The battery assembly 120 is housed and held inside the casing 110.

The casing 110 constitutes a substantially rectangular block housing with an upper base UPB, a lower base LOB, and side plates 130 and 131. In other words, the casing 110 is constituted with a combination of three members. An explanation will now be made with reference to FIG. 3 to FIG. 5. The upper base UPB includes an inlet channel forming plate 111, an outlet-side guide plate 113, a cooling medium inlet 114, and a cooling medium inlet duct 116 that are integrally formed from die-cast aluminium. The lower base LOB includes an outlet channel forming plate 118, an inlet-side guide plate 112, a cooling medium outlet 115, and a cooling medium outlet duct 117 that are integrally formed from die-cast aluminium. It is to be noted that the upper base UPB and the lower base LOB are casing bodies bolted with each other at the longitudinal end portions so as to form a circular member with both of the side surfaces being open. The interior space of the casing 110 functions as a housing chamber in which the battery assembly 120 constituted with a plurality of battery cells 140 is housed and also functions as a cooling channel through which a cooling medium, i.e., cooling air, flows to cool down the battery assembly 120.

It is to be noted that in the explanation provided below, a direction with the longest dimension of the casing 110 and a direction from the cooling medium inlet 114 side to the cooling medium outlet 115 side are defined as a longitudinal direction. A direction in which two side surfaces, i.e., the two side plates 130 and 131, different from the two side surfaces, i.e., the inlet-side guide plate 112 and the outlet-side guide plate 113, that face each other in the longitudinal direction of the casing 110, face each other, a central axial direction of the lithium ion battery cells 140 (a direction in which two electrodes of the positive terminal and the negative terminal face each other), and a direction in which a conductive member 150, which electrically connects two of the lithium ion battery cells 140, and two of the lithium ion battery cells 140 face each other are defined as a transverse direction. In addition, a direction in which the inlet channel forming plate 111 and the outlet channel forming plate 118 face each other is defined as a height direction regardless of the installation orientation of the battery module 100.

The inlet channel forming plate 111 is a rectangular flat plate that forms the top surface of the casing 110. The outlet channel forming plate 118 is a flat plate that forms the bottom surface of the casing 110. The inlet channel forming plate 111 and the outlet channel forming plate 118 are displaced with respect to each other in the longitudinal direction. As a result, the positions of the longitudinal end portions of the inlet channel forming plate 111 and the outlet channel forming plate 118 are displaced with respect to each other in the longitudinal direction.

The inlet channel forming plate 111, i.e., the top surface of the upper base UPB is provided with a mounting section 110S with which the control unit 900 is mounted. A mounting section 110S is an internally threaded boss. As shown in FIGS. 1 and 2, the base 910 of the conductive control unit 900, on which the battery controller 300 and the cell controller 200 are to be mounted, is bolted to and in electrical communication with the mounting sections 110S of the pair of battery blocks 100a and 100b. As described above, the battery controller 300 and the cell controller 200 are mounted on the base 910 so that their negative terminals are in electrical communication with the base 910 of the control unit 900. The control unit 900 is mounted astride both the battery blocks 100a and 100b so as to juxtapose and integrate the higher potential battery block 100a and the lower potential battery block 100b. In other words, both the blocks 100a and 100b are integrated by mounting the control unit 900, i.e., the base 910 onto the battery blocks 100a and 100b.

It is to be noted that the battery blocks 100a and 100b are constituted by housing the plurality of battery cells 140 in the conductive casing 110. The casing 110 is then electrically and mechanically connected to the vehicle body (chassis) through the conductive module base 101. The potential at the negative terminals of the battery controller 300 and the cell controller 200 therefore becomes equal to the ground potential at the vehicle body through the casing 110. As a result, a ground wire through which the battery controller 300 and the cell controller 200 are grounded to the vehicle body is not required.

The inlet-side guide plate 112 is a plate-like member that forms one side of the side surfaces facing the longitudinal direction of the casing 110. The outlet-side guide plate 113 is a plate-like member that forms the other side of the side surfaces facing the longitudinal direction of the casing 110.

The cooling medium inlet 114 that constitutes an inlet via which cooling air, a cooling medium, is led into the casing 110 is formed between the inlet channel forming plate 111 and the inlet-side guide plate 112. The cooling medium inlet 114 is provided with the cooling medium inlet duct 116 to lead cooling air to the cooling medium inlet 114. As described above, the inlet channel forming plate 111 and the outlet channel forming plate 118 are displaced with respect to each other, and the inlet-side end of the casing 110 is formed in steps. As a result, a space is formed in the longitudinal direction between the cooling medium inlet 114 and the inlet-side guide plate 112. A gas outlet pipe 139 that will be described later is housed in this space. As shown in FIG. 3, the inlet-side guide plate 112 is disposed at the back of the gas outlet pipe 139. By adopting this structure, the dimension of the battery module 1000 can be reduced in the longitudinal direction. The cooling medium outlet 115 that constitutes an outlet via which cooling air is led from inside the casing 110 is formed between the outlet channel forming plate 118 and the outlet-side guide plate 113. The cooling medium outlet 115 is provided with the cooling medium outlet duct 117 to lead cooling air from the cooling medium outlet 115 to the exterior.

The cooling medium inlet 114 and the cooling medium outlet 115 are displaced with respect to each other in the height direction (the direction in which the inlet channel forming plate 111 and the outlet channel forming plate 118 face each other). In other words, the cooling medium inlet 114 is positioned on the inlet channel forming plate 111 side, and the cooling medium outlet 115 is positioned on the outlet channel forming plate 118 side.

The inlet channel forming plate 111, the outlet channel forming plate 118, the inlet-side guide plate 112, the outlet-side guide plate 113, the cooling medium inlet 114, and the cooling medium outlet 115, which constitute the upper base UPB and the lower base LOB, and the side plates 130 and 131 are connected by a fixing means such as screws, bolts, or rivets. A sealing member (not shown) is provided between connection members of those connection sections so as to improve airtightness inside the casing 110 and allow the cooling medium that has been led inside the casing 110 via the cooling medium inlet 114 to be discharged through the cooling medium outlet 115 without leaking out.

The side plates 130 and 131 are flat plate-like members that form two side surfaces which face the casing 110 in the transverse direction, and are moldings made of a resin such as PBT that has electrical insulation properties. The wall thicknesses of the side plates 130 and 131 are greater than those of the inlet channel forming plate 111, the outlet channel forming plate 118, the inlet-side guide plate 112, and the outlet-side guide plate 113. The structures of the side plates 130 and 131 will be described later in detail.

A cover member 160, which is called as a side cover, is provided outside the side plates 130 and 131, i.e., on the opposite side of the housing chamber of the battery assembly 120. While only the cover member 160 provided outside the side plate 130 is illustrated in FIG. 5, the cover member 160 is provided also outside the side plate 131. The cover member 160 is fixed to the side plate 130 with a fixing means 161 such as bolts or rivets.

The cover plate 160 is a flat plate prepared by pressing a metal plate of steel, aluminium, or the like, or a flat plate prepared by shaping a resin of PBT or the like, and is configured into substantially the same shape as the planar shape of the side plate 130. The cover plate 160 has a region that includes a section corresponding to through-holes 132 of the side plate 160 to be described later uniformly bulging towards the opposite side of the side plate 130. As a result, a space is formed between the cover plate 160 and the side plate 130. This space functions as a gas release chamber, or a gas release channel, through which mist gas having been emitted from the lithium ion battery cells 140 is released separately from the cooling medium that flows through the cooling channel.

The battery assembly 120 is an assembly (lithium ion battery cell group) of the plurality of lithium ion battery cells 140. The plurality of lithium ion battery cells 140 are aligned and housed in the housing chamber formed inside the casing 110, sandwiched by the side plates 130 and 131 from the transverse direction, and electrically connected in series by joining the plurality of conductive members 150 called bus bars.

The lithium ion battery cells 140 assume a structure in columnar shape, constituted with component parts such as a cell element and a safety valve which are housed inside a battery case in which electrolytic solution has been injected. A positive-side safety valve is a split valve that splits when the pressure inside the battery case becomes a predetermined pressure due to an abnormality such as overcharge. The safety valve functions as a fuse mechanism that splits so as to block the electrical connection between a battery lid and the positive side of the cell element, and functions as a decompression mechanism that emits gas generated inside the battery case, i.e., mist carbon dioxide gas (the jet) including electrolytic solution, to the outside of the battery case.

The negative side of the battery case is also provided with a split groove, which splits when the pressure inside the battery case becomes a predetermined pressure due to an abnormality such as overcharge. As a result, the gas generated inside the battery case can also be emitted from the negative terminal side. The nominal output voltage of the lithium ion battery cell 140 is 3.0 to 4.2V and the average nominal output voltage is 3.6V.

An embodiment assumes the battery assembly 120 constituted by aligning and disposing sixteen of the cylindrical lithium ion battery cells 140 inside the casing 110. More specifically, in the state in which the lithium ion battery cells 140 are placed on their sides so that the central axes of the lithium ion battery cells 140 extend along the transverse direction, eight of the lithium ion battery cells 140 are disposed in parallel so as to constitute a first battery cell array 121. In addition, similar to the first battery cell array 121, eight of the lithium ion battery cells 140 are disposed so as to constitute a second battery cell array 122. The battery assembly 120 is constituted by layering (stacking or header bond) the first battery cell array 121 and the second battery cell array 122 in the height direction. In other words, the battery assembly 120 is constituted by arranging eight arrays of the lithium ion battery cells 140 in the longitudinal direction and two stacks or two layers thereof in the height direction.

The first battery cell array 121 and the second battery cell array 122 are displaced with respect to each other in the longitudinal direction. In other words, the first battery cell array 121 is disposed closer to the inlet channel forming plate 111 side than the second battery cell array 122 is, and displaced towards the cooling medium inlet 114 side. On the other hand, the second battery cell array 122 is disposed closer to the outlet channel forming plate side than the first battery cell array 121 is, and displaced towards the cooling medium outlet 115 side. As shown in FIG. 5, an embodiment assumes the first battery cell array 121 and the second battery cell array 122, which are displaced with respect to each other in the longitudinal direction, so that, for instance, the longitudinal position of the central axis of one of the lithium ion battery cells 140 lying closest to the cooling medium outlet 115 in the first battery cell array 121 lies in the middle between the central axis of one of the lithium ion battery cells 140 lying closest to the cooling medium outlet 115 in the second battery cell array 122 and the central axis of one adjacent thereto of the lithium ion battery cells 140.

The lithium ion battery cells 140 that constitute the first battery cell array 121 are juxtaposed so as to alternate the directions of the terminals thereof. The lithium ion battery cells 140 that constitute the second battery cell array 122 are also juxtaposed so as to alternate the directions of the terminals thereof. However, the sequence from the cooling medium inlet 114 side to the cooling medium outlet 115 side of the terminals of the lithium ion battery cells 140 that constitute the first battery cell array 121 is different from that of the terminals of the lithium ion battery cells 140 that constitute the second battery cell array 122. More specifically, in the first battery cell array 121, the lithium ion battery cells 140 are disposed so that the terminals thereof facing the side plate 130 side are arranged in order of the negative terminal, the positive terminal, the negative terminal, . . . , the positive terminal from the cooling medium inlet 114 side to the cooling medium outlet 115 side. In the second battery cell array 122, on the other hand, the lithium ion battery cells 140 are disposed so that the terminals thereof facing the side plate 130 side are arranged in order of the positive terminal, the negative terminal, the positive terminal, . . . , the negative terminal from the cooling medium inlet 114 side to the cooling medium outlet 115 side.

By thus disposing the first battery cell array 121 and the second battery cell array 122 displaced in the longitudinal direction, the battery assembly 120 can be reduced in dimension in the height direction and the higher potential battery block 110a can hence be reduced in size in the height direction.

Next, an explanation will be made in detail in terms of the structure of the side plates 130 and 131 that sandwich the battery assembly 120. While the explanation will be given with regard to the structure of only the side plate 130 in the interests of brevity, the side plate 131 is configured basically the same as the side plate 130.

However, a battery module side connection terminal 180 electrically connected to the positive-side of the battery assembly 120 and a battery module side connection terminal 181 electrically connected to the negative-side of the battery assembly 120 are provided only on the side plate 130. The connection terminals 180 and 181 are aligned in the longitudinal direction on the top surface of the side plate 130, i.e., on the surface of the inlet channel forming plate 111 side. A DC positive-side input/output terminal 183 and a negative-side input/output terminal 184, which have been formed as a subassembly 185 separately from the battery module 100, are connected to the connection terminals 180 and 181, respectively. A terminal of the positive-side power cable 610 is connected to the positive-side input/output terminal 183 of the higher potential battery block 110a, and a terminal of a cable that is electrically connected to one end of the SD switch 700 is connected to the negative-side input/output terminal 184 (refer to FIG. 1). A terminal of a cable electrically connected to the other end of the SD switch 700 is connected to the positive-side input/output terminal 183 of the lower potential battery block 110b. A terminal of the negative-side power cable 620 is connected to the negative-side input/output terminal 184 of the lower potential battery block 110b. It is to be noted that in FIG. 2, the subassembly 185 of the higher potential battery block 100a represents the state in which the subassembly 185 is covered with a terminal cover whilst the subassembly 185 of the lower potential battery block 100b represents the state in which the terminal cover is removed.

The side plate 130 is formed into a substantially rectangular flat plate as shown in FIG. 5. Sixteen of the round through-holes 132 that penetrate in the transverse direction are formed on the side plate 130. The sixteen through-holes 132 are disposed in line with the sixteen lithium ion battery cells 140 so as to open corresponding to the electrode positions of the sixteen lithium ion battery cells 140 aligned as described earlier. Accordingly, when the battery assembly 120 is housed in the casing 110, the sixteen through-holes 132 on the side plate 130 are closed with a terminal surface on one end of the sixteen lithium ion battery cells 140, and the sixteen through-holes 132 on the side plate 131 side are closed with a terminal surface on the other end of the sixteen lithium ion battery cells 140.

A protruding section 133 is formed partially encompassing the through-holes 132 on an outer wall surface 170 of the side plate 130, which is opposite to an inner wall surface with which the housing chamber of the battery assembly 120 is formed. In addition, between the through-holes 132 on the outer wall surface 170, a plurality of fixing guides 130a are formed so as to dispose the conductive members 150 connected to the lithium ion battery cell 140. The protruding section 133 and the fixed guides 130a are each configured to protrude from the outer wall surface 170 so as to prevent the cover member 160 and the conductive members 150 from contacting each other. This allows the cover member 160 and the conductive members 150 to be prevented from short circuiting if the cover member 160 is constituted with, for instance, a flat metal plate such as steel.

The side plate 130 is provided with a gas discharge channel 138 through which the gas, which is mixture gas with fluid including electrolytic solution, that has been released to the gas release chamber between the side plate 130 and the cover member 160 is discharged outside the higher potential battery block 100a. An opening section of the gas discharge channel 138 is formed on a lower part of the side plate 130 in view of discharge of fluid such as electrolytic solution included in the gas. More specifically, the opening section is formed on the cooling medium inlet 140 side of the side plate 130 and the side plate 130 on the outlet channel forming plate 118 side. A front end section of the gas discharge channel 138 is formed in a pipe-like shape, to which the gas outlet pipe 139 (refer to FIG. 3) through which the gas having been discharged through the gas discharge channel 138 is led out is connected. The conductive members 150 are metal, for example copper, plate-like members that electrically connect between the lithium ion battery cells 140, and are constituted separately from the side plate 130. However, as shown in FIG. 5, the conductive member 150a having been integrally formed with the connection terminal 180 and the conductive member 150b having been integrally formed with the connection terminal 181 are integrally formed with the side plate 130. The cover member 160 is joined to each of the side plates 130 and 131 via a sealing member 135 and fixed with the fixing means 161 such as bolts, screws, or rivets. The sealing member 135 is an elastic, circular sealing member (for instance, a rubber O-ring) that is fitted in a groove 134 formed on the side plate 130. Liquid gasket may instead be used as the sealing member 135.

Two connection terminals 810 are aligned in the longitudinal direction on the top surface of the side plate 130, i.e., the surface on the inlet channel forming plate 111 side. The connection terminals 810 are integrally formed on the side plate 130 with the same forming material as that of the side plate 130, and disposed on the top surface of the side plate 130 towards the cooling medium inlet 114 side. Each of the connection terminals 810 includes a current block section 811 so as to electrically connect the wire (connecting line) 800 that extends from a voltage detection connector 912 of the control unit 900 with a voltage detection conductor, which is not figured, via the current block section. The voltage detection connector 912 is provided on each end in the transverse direction of the control unit 900. The connecting wire 800 connected to the connection terminals 810 provided on the higher potential battery block 100a is connected to the connector 912 of the control unit 900 disposed above the higher potential battery block 100a. The connecting wire 800 connected to the connection terminals 810 provided on the lower potential battery block 100b, on the other hand, is connected to the connector 912 of the control unit 900 disposed above the lower potential battery block 100b. In order to prevent erroneous wiring, the length of the connecting wire 800 is set so as to be equivalent to the distance between each of the connection terminals 810 and the connector 912 corresponding thereto. For example, the length of the connecting wire 800 connected to the connection terminals 810 of the higher potential battery block 100a is set so as not to reach the connector 912 of the lower potential battery block 100b. The current block section 811 includes a fuse wire that is fused in the event of an abnormality of the control circuit 900 and the wire 800 so as to block current from the battery assembly 120 and protect the product.

Figure 6:
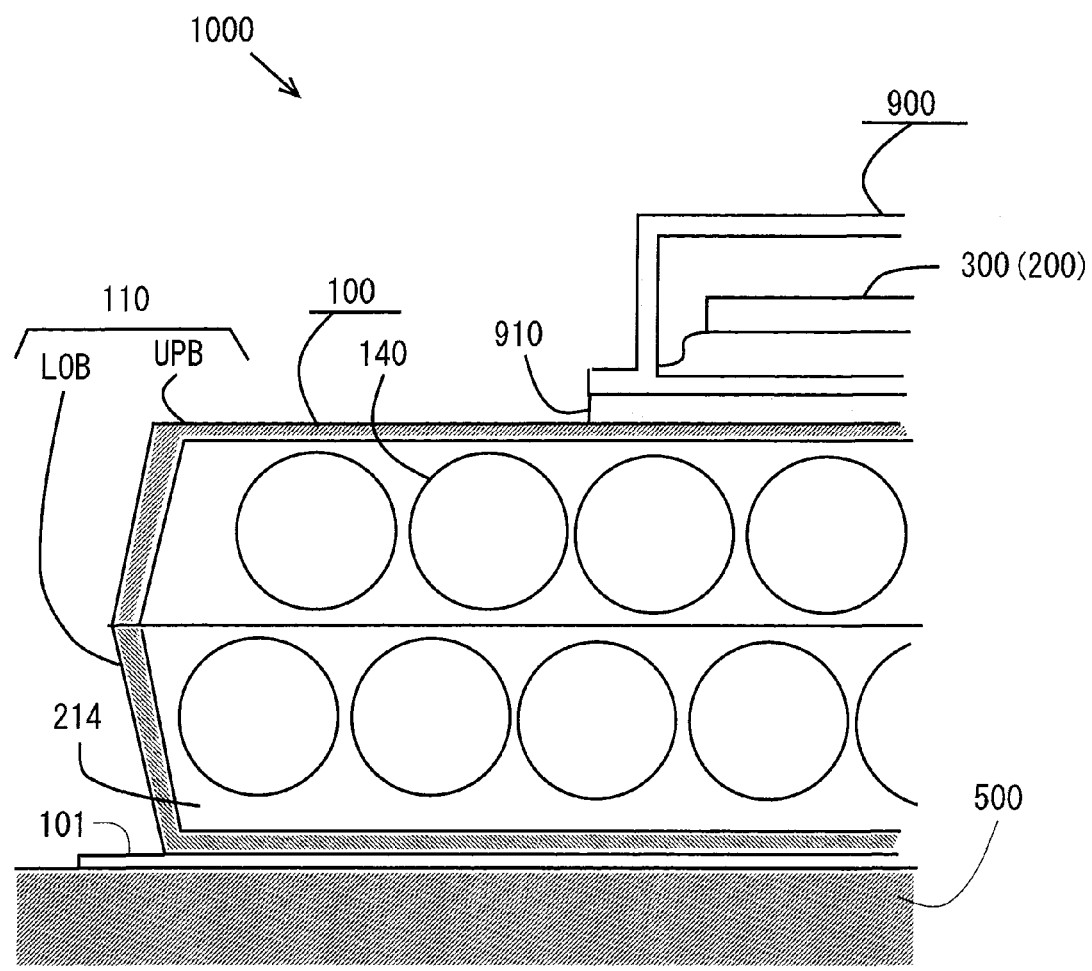
FIG. 6 is a vertical sectional view of a battery block, illustrating vehicle body grounding of the battery controller.

The characteristic structure of the electrical storage device 1000 will now be explained with reference to FIG. 6. A reference numeral 500 represents a chassis of an electric powered vehicle on which a drive device that drives travel on electric power at the battery module 100 is mounted. The battery module 100 is bolted to the chassis 500 through the module base 101, which is a mounting member, and is also electrically connected to the chassis. The module base 101 is fixed and fastened to the lower base LOB and electrically connected to the lower base, and the lower base LOB is fixed and fastened to the upper base UPB and electrically connected to the upper base. In addition, the base 910 of the control unit 900 is fixed and fastened to the upper base UPB and electrically connected to the upper base. The battery controller 300 and the cell controller are mounted on the base 910 so that their negative terminals are electrically conducting. This structure allows the negative terminals of the battery controller 300 and the cell controller 200 mounted on the base 910 to be electrically connected to the chassis 500 through the base 910, the upper base UPB, the lower base LOB, and the module base 101. The negative terminals of the control unit 900, i.e., the battery controller 300 and the cell controller 200, can thus be in electrical communication with the chassis 500 without using a ground wire.

The base 910, the upper base UPB, and the lower base LOB of the control unit 900 are of aluminium die cast and hence include high conductivity and strength. The module base 101 is formed from a steel plate and hence includes sufficient conductivity and high strength.

The following operations and advantageous effects can be achieved according to the embodiment of the electrical storage device explained above.

(1) The casing 110 in which battery cells are housed is formed of a conductive material and the base 910 of the control unit 900 is electrically connected to the battery house casing 110 so as to eliminate the need of a special ground wire outside the battery house casing 110. This allows the grounding structure of the control unit 900 that includes the battery controller 300 and the cell controller 200 to be simplified, wiring work to be easy, and noise contamination from the ground wire to the battery controller 300 and the cell controller 200 to be prevented.

(2) The upper base UPB and the lower base LOB that constitute the casing 110 are of aluminium die cast. The battery module 100 is set up at a position on which the weight of the operator may act during assembly work of the vehicle. The casing 110 in which the battery cells are housed is manufactured from die-cast aluminium so as to design the battery house casing 110 with the strength that prevents the casing 110 from being deformed even if the weight of the operator acts thereon.

The electrical storage device according to the present invention may be varied as follows.

(1) While in the above embodiment the casing 110 assumes a split structure with the lower base LOB and the upper base UPB and they are integrated by bolting or the like, the lower base LOB and the upper base UPB may be formed of a single member.

(2) The base 910 for controller, the upper base UPB, the lower base LOB, and the module base 101 may be formed of a conductive material other than that explained above.

(3) While the casing 110 is circularly formed with both of the side surfaces being open, it is acceptable that the casing 110 is formed in a shape with one of the side surfaces being open and only the open side surface is closed with the side plate.

(4) In the embodiment explained above, the example is presented with regard to the battery module 100 constituted with the two battery blocks 100a and 100b to which the sixteen lithium ion battery cells 140 are connected. However, the present invention is not limited to the structure of the battery module 100 and the connection configurations (serial and parallel) which are described above, and is applied to a battery module including a various number of the lithium ion battery cells 140, a various number of the battery cell arrays, and various alignments and directions.

(5) While in the embodiment explained above an example of cylindrical battery cells assumed as the lithium ion battery cells 140 is given, the present invention is not limited thereto. For instance, the shape of the lithium ion battery cells 140 may be applied to rectangular storage batteries and laminate-sealed batteries, and also applied to batteries such as nickel-metal hydride batteries other than lithium ion batteries.

(6) The electrical storage device 1000 according to the embodiment described above may be used in vehicle power source devices for other electric vehicles, for instance, train vehicles such as hybrid trains, public transport vehicles such as buses, freight vehicles such as trucks, and work vehicles such as battery forklift trucks.

(7) The electrical storage device 1000 according to the embodiment may be applied to electrical storage devices that constitute power source devices other than those used in electric vehicles, such as uninterruptible power source devices used in computer systems, server systems, and the like and power source devices used in household power generation equipment.

The above explanation is merely an example, and the present invention is not limited to the embodiments described above. The electrical storage device according to the present invention may therefore be an electrical storage device in any mode, as long as it includes a conductive battery house casing electrically connected to a chassis, a plurality of battery cells held in the battery house casing, and a control unit that includes a circuit that manages the plurality of battery cells and is mounted on the battery house casing so that a negative terminal of the circuit and the battery house casing are electrically conducting.

What is claimed is:

1. An electrical storage device comprising:
   a plurality of conductive battery house casings electrically connected to a chassis;
   a plurality of battery cells housed and held in the battery house casings; and
   a control unit that is disposed outside the battery house casings and comprises a circuit that monitors a state of the plurality of battery cells, wherein:
   the circuit comprises a terminal for grounding; and
   a conductive base of the control unit is directly fixed to the battery house casings and the terminal for grounding of the circuit is electrically connected to the battery house casings through the base so as to ground the circuit to the chassis;
   wherein a battery assembly constituted with the plurality of battery cells is housed in the plurality of battery house casings, wherein:
   the base is mounted astride the plurality of battery house casings and is directly fixed to each of the plurality of the battery house casings; and
   the terminal is electrically connected to the plurality of the battery house casings through the base so as to be grounded to the chassis.

2. An electrical storage device according to claim 1, wherein:
   the battery house casings each comprise:
   a casing body that is formed with a conductive lower base and a conductive upper base that is disposed above the lower base and is connected to the lower base so as to form the casing body circularly with both side surfaces being open; and
   side plates that hold the battery cells while closing the both side surfaces of the casing body;
   the base is fixed directly to the upper base; and
   the terminal is electrically connected to the lower base through the base and the upper base so as to be grounded to the chassis.

3. An electrical storage device according to claim 1, wherein: the battery house casings are formed from die-cast aluminium.

4. An electrical storage device according to claim 1, wherein:
   The plurality of battery house casings are integrated by the base.

5. An electric powered vehicle, comprising:
   a travel drive device that generates travel drive on electric power;
   an electrical storage device according to claim 1 that generates the electric power; and
   a vehicle body on which the travel drive device is provided, wherein:
   the plurality of battery house casings is mounted on the vehicle body through a mounting member; and
   a potential of the vehicle body is used as a ground potential.

6. An electrical storage device comprising:
   a conductive mounting member that is fixed to a chassis;
   a plurality of conductive battery house casings that is fixed to the mounting member and is electrically connected to the chassis through the mounting member;
   a plurality of battery cells housed and held in the battery house casings; and
   a control unit that is disposed outside the battery house casings, and comprises a circuit, mounted on a board, that monitors a state of the plurality of battery cells and a conductive base on which the board is mounted, wherein:
   the circuit comprises a terminal for grounding; and
   the base is directly fixed to the battery house casings and the terminal for grounding of the circuit is electrically connected to the mounting member through the base and the battery house casings so as to ground the circuit to the chassis;
   wherein a battery assembly constituted with the plurality of battery cells is housed in the plurality of battery house casings, wherein:
   the base is mounted astride the plurality of battery house casings and is directly fixed to each of the plurality of the battery house casings; and
   the terminal is electrically connected to the mounting member through the base and the plurality of the battery house casings so as to be grounded to the chassis.

7. An electrical storage device according to claim 6, wherein:
   each of the battery house casings comprises:
   a casing body that is formed with a conductive lower base that is fixed to the mounting member and a conductive upper base that is disposed above the lower base and is connected to the lower base so as to form the casing body circularly with both side surfaces being open; and side plates that hold the battery cells while closing the both side surfaces of the casing body;

the base is fixed directly to the upper base; and the terminal is electrically connected to the mounting member through the base, the upper base and the lower base so as to be grounded to the chassis.

8. An electrical storage device according to claim 6, wherein:

the plurality of battery house casings are integrated by the base.

9. An electrical storage device according to claim 6, wherein:

the battery house casings are formed from die-cast aluminium.

10. An electric powered vehicle, comprising:

a travel drive device that generates travel drive on electric power;

an electrical storage device according to claim 6 that generates the electric power; and a vehicle body on which the travel drive device is provided, wherein:

the plurality of battery house casings is mounted on the vehicle body through a mounting member; and a potential of the vehicle body is used as a ground potential.

* * * * *